United States Patent
Chang et al.

(10) Patent No.: US 11,603,944 B2
(45) Date of Patent: Mar. 14, 2023

(54) SOLAR FAIL-SAFE DEVICE

(71) Applicant: Enertork Co., LTD., Gyeonggi-do (KR)

(72) Inventors: Ki Won Chang, Seoul (KR); Yeon Hong Yun, Incheon (KR); Jae Doo Jeon, Chungcheongbuk-do (KR)

(73) Assignee: Enertork Co., LTD., Gyeonggi-Do (KR)

(*) Notice: Subject to any disclaimer, the term of this patent is extended or adjusted under 35 U.S.C. 154(b) by 0 days.

(21) Appl. No.: 17/383,710

(22) Filed: Jul. 23, 2021

(65) Prior Publication Data
US 2022/0136614 A1 May 5, 2022

(30) Foreign Application Priority Data
Nov. 4, 2020 (KR) .................. 10-2020-0145653

(51) Int. Cl.
*H02J 9/06* (2006.01)
*F16K 17/36* (2006.01)
*F16K 31/04* (2006.01)

(52) U.S. Cl.
CPC .......... *F16K 17/363* (2013.01); *F16K 31/042* (2013.01); *H02J 9/06* (2013.01); *H02J 2300/22* (2020.01)

(58) Field of Classification Search
CPC ........ F16K 17/363; F16K 31/042; H02J 9/06; H02J 2300/22; H02J 7/0013; H02J 1/108; H02J 7/35; H02J 9/061; H02S 40/00
See application file for complete search history.

(56) References Cited

U.S. PATENT DOCUMENTS

| | | | |
|---|---|---|---|
| 2010/0288267 A1* | 11/2010 | Kanack | F24S 50/00 29/890.033 |
| 2017/0087973 A1* | 3/2017 | Gaither | B60K 16/00 |
| 2017/0268205 A1* | 9/2017 | Schirado | A01G 25/165 |
| 2017/0366020 A1* | 12/2017 | Brookshire | H02J 7/0063 |
| 2021/0017890 A1* | 1/2021 | Schmidt | B67D 7/362 |

* cited by examiner

*Primary Examiner* — Lincoln D Donovan
*Assistant Examiner* — Alex W Lam
(74) *Attorney, Agent, or Firm* — The PL Law Group, PLLC

(57) ABSTRACT

A solar fail-safe device according to an embodiment of the present disclosure is capable of operating a valve by using sunlight and operating the valve in an emergency in which electricity is not supplied to an actuator unit moving the valve. A solar fail-safe device may include a solar panel module producing electricity from solar energy, an actuator unit including an actuator moving a valve by using electricity as a power source, and a fail-safe part moving the valve by using emergency electricity with which the fail-safe part is pre-charged, and a control unit receiving the electricity produced from the solar panel module to charge a first and a second battery and to supply the electricity to the actuator unit. The actuator may move the valve by using the emergency electricity when a voltage at which the electricity is applied from the control unit is less than a predetermined value.

11 Claims, 8 Drawing Sheets

(a)

(b)

(a)

(b)

SOLAR FAIL-SAFE DEVICE

CROSS REFERENCE TO RELATED APPLICATION

The present application claims priority to Korean Patent Application No. 10-2020-0145653, filed on Nov. 4, 2020, the entire contents of which is incorporated herein for all purposes by this reference.

BACKGROUND

1. Field of the Invention

The present disclosure relates to a solar fail-safe device that operates an actuator in an emergency when a power failure or a fault in the device occurs in which the supply of solar power to the actuator is limited.

2. Description of the Related Art

For a motor-operated valve in the related art, when problems occur, for example, an external power source is disconnected because of a power failure, broken wires, occurrence of a short circuit, etc., the valve has no supplied power to drive the motor, and the operation of the valve remains stopped. In this case, a user is unable to control the valve, which causes accidents. Although there is a handle for opening and closing the motor-operated valve manually for the disconnection of the power source, if the user is unable to determine whether the power source is disconnected or not, it is impossible to operate the motor-operated valve manually and to control the valve.

The foregoing is intended merely to aid in the understanding of the background of the present disclosure, and is not intended to mean that the present disclosure falls within the purview of the related art that is already known to those skilled in the art.

SUMMARY

The present disclosure is directed to providing a solar fail-safe device capable of operating a valve in an emergency in which electricity is not supplied to an actuator unit driving the valve.

According to an embodiment of the present disclosure, there is provided a solar fail-safe device including: a solar panel module producing electricity from solar energy; an actuator unit including an actuator moving a valve by using electricity as a power source, and a fail-safe part moving the valve by using emergency electricity with which the fail-safe part is pre-charged; and a control unit receiving the electricity produced from the solar panel module to charge a first and a second battery and to supply the electricity to the actuator unit, wherein the actuator moves the valve by using the emergency electricity when a voltage at which the electricity is applied from the control unit is less than a predetermined value.

According to an embodiment of the present disclosure, the solar fail-safe device includes: the solar panel module producing electricity from solar energy; the actuator unit including the actuator moving the valve by using electricity as a power source, and the fail-safe part moving the valve by using emergency electricity with which the fail-safe part is pre-charged; and the control unit receiving the electricity produced from the solar panel module to charge the first and the second battery and to supply the electricity to the actuator unit.

When the voltage at which electricity is applied from the control unit is less than a predetermined value, the actuator can move the valve by using the emergency electricity with which charging is performed.

According to an embodiment of the present disclosure, the solar fail-safe device can move the valve to a preset position even when electricity to the actuator unit moving the motor is disconnected.

According to an embodiment of the present disclosure, the solar fail-safe device can operate multiple times rather than one time because the valve is moved using the battery.

The solar fail-safe device can be in one among a rest mode, a normal mode, and an emergency mode. In the rest mode, a rest period in which the valve is not opened and closed lasts, and the first battery of the control unit and the second battery of the fail-safe part are charged. The valve can operate with the electricity with which the batteries are charged, in the normal mode and the emergency mode.

The normal mode may be at least one among a first normal mode and a second normal mode. In the first normal mode, the first battery and the second battery may be charged. In the second normal mode, the first battery may be discharged and the discharged electricity may be supplied to the actuator unit to operate the valve, and the second battery may be charged.

In the emergency mode, the second battery of the fail-safe part is discharged so that electricity can be supplied to the actuator.

BRIEF DESCRIPTION OF THE DRAWINGS

The above and other objectives, features, and other advantages of an embodiment of the present disclosure will be more clearly understood from the following detailed description when taken in conjunction with the accompanying drawings, in which.

Figure 2:
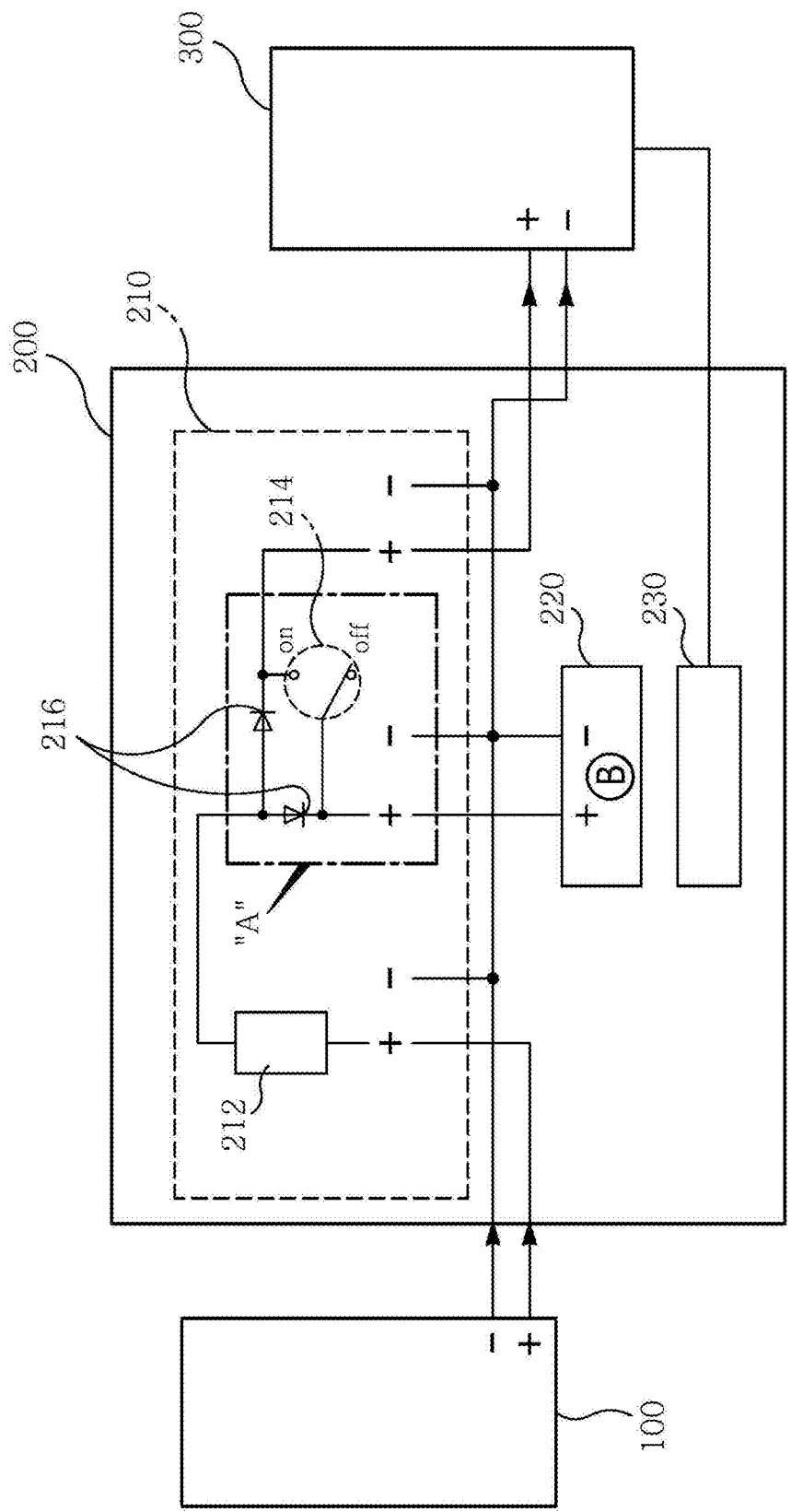
FIG. 2 is a circuit diagram of a control unit according to an embodiment of the present disclosure.
Figure 3:
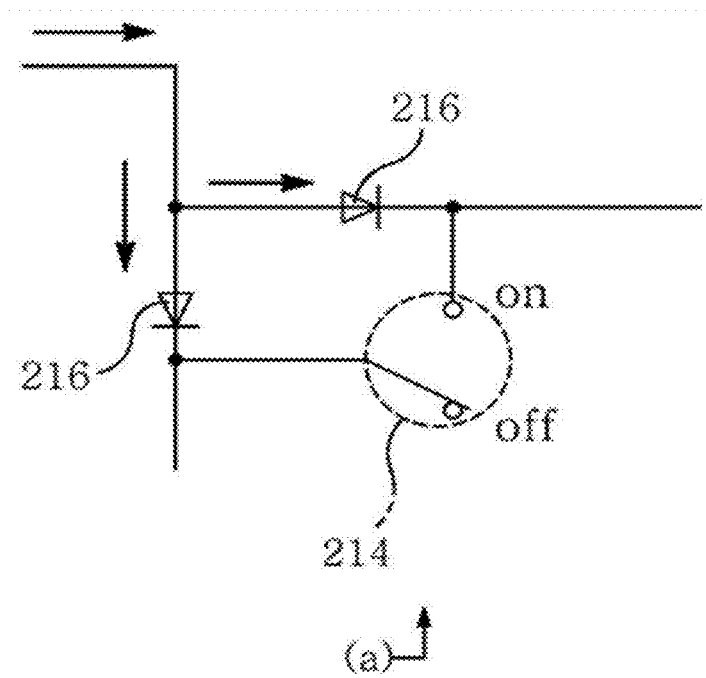
Figure 3:
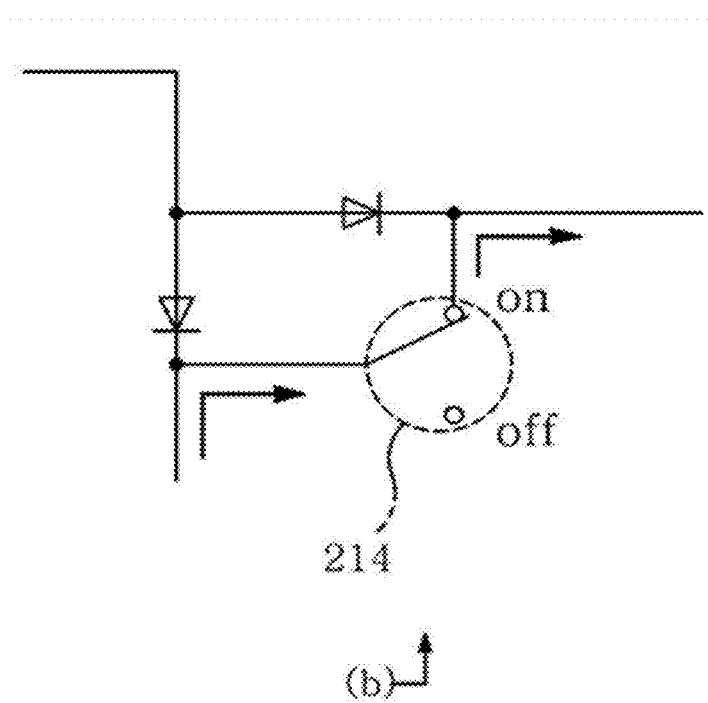
Figure 4:
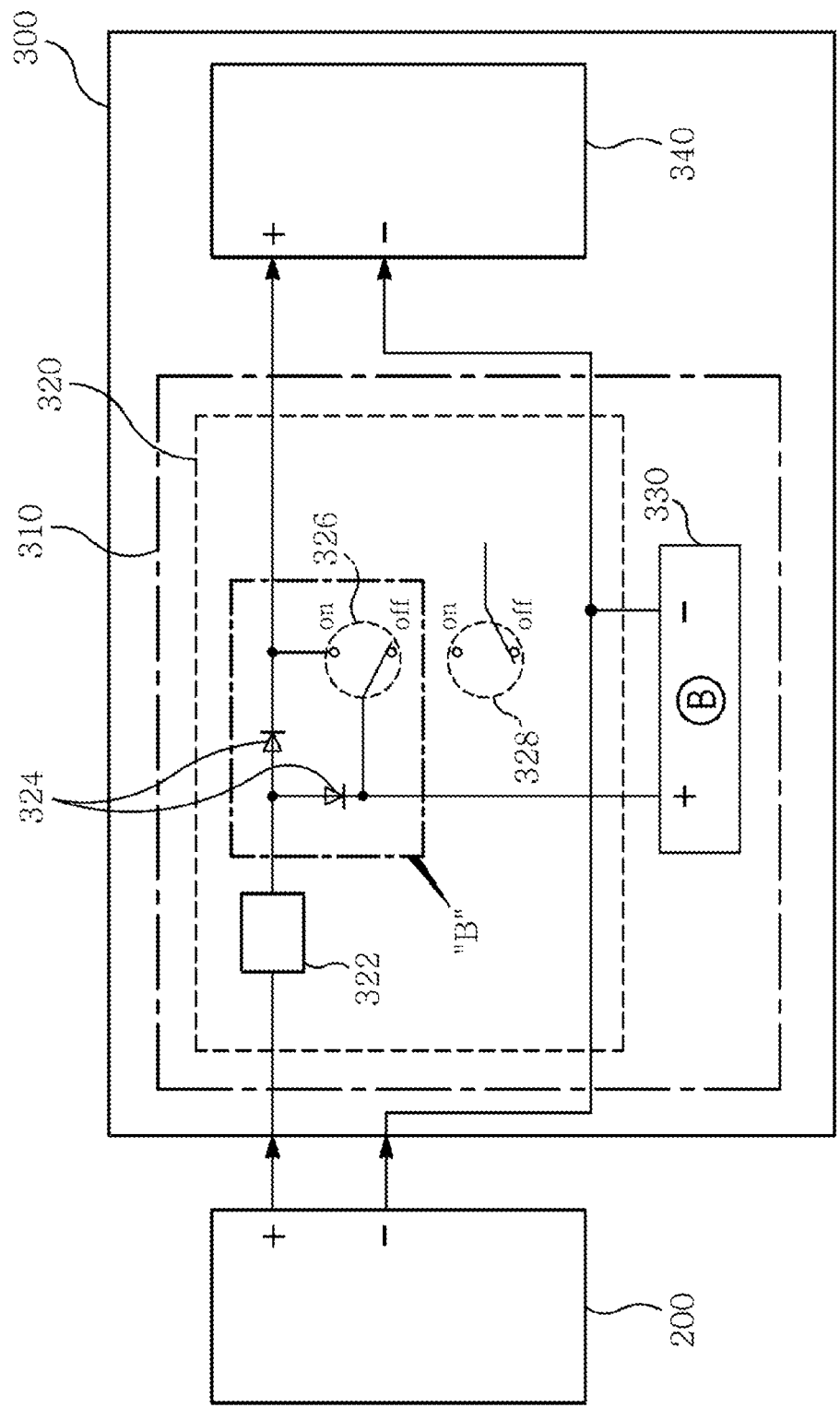
Figure 5:
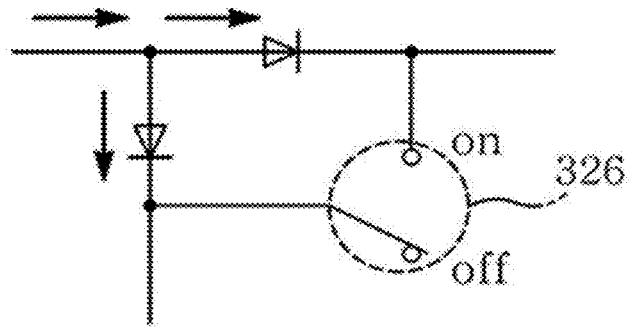
Figure 5:
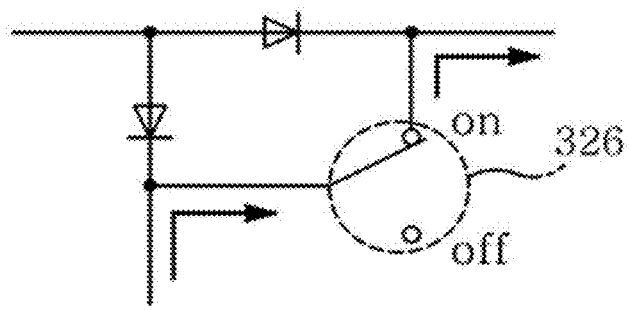
Figure 6:
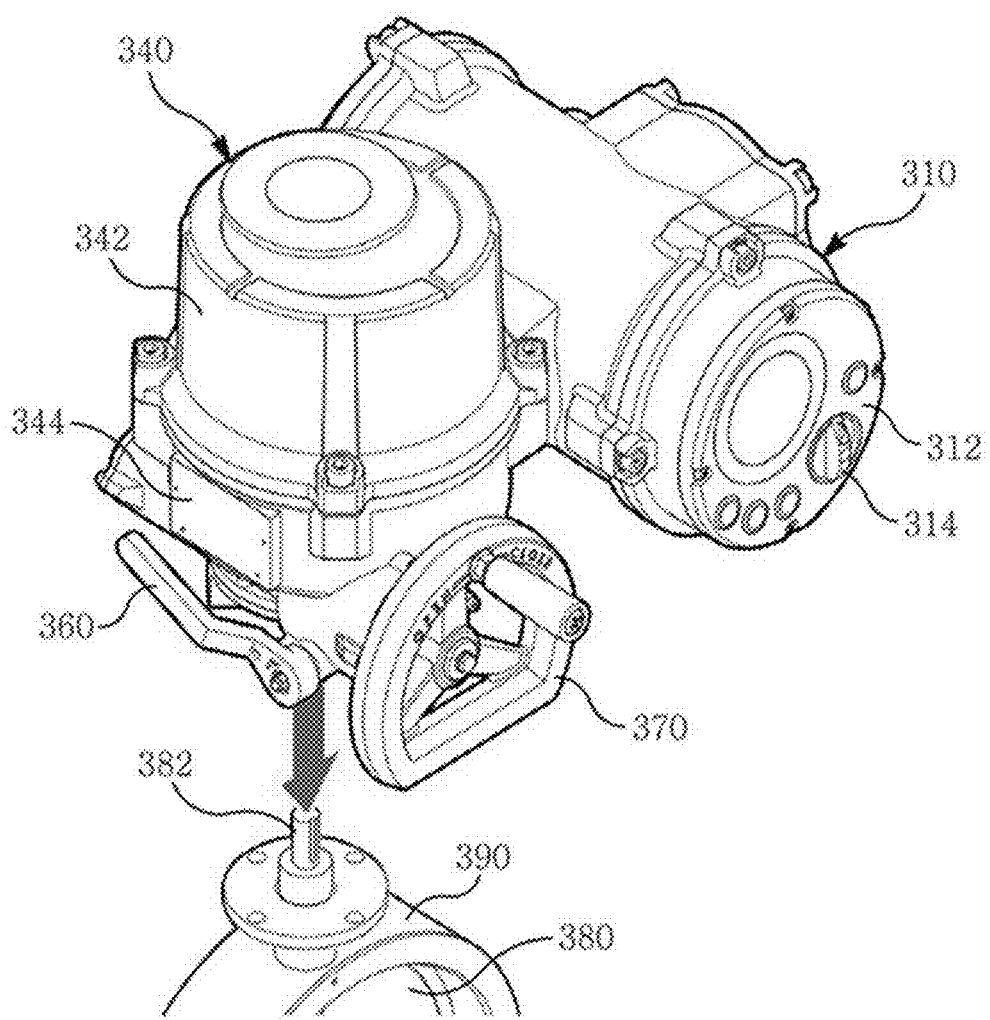
Figure 7:
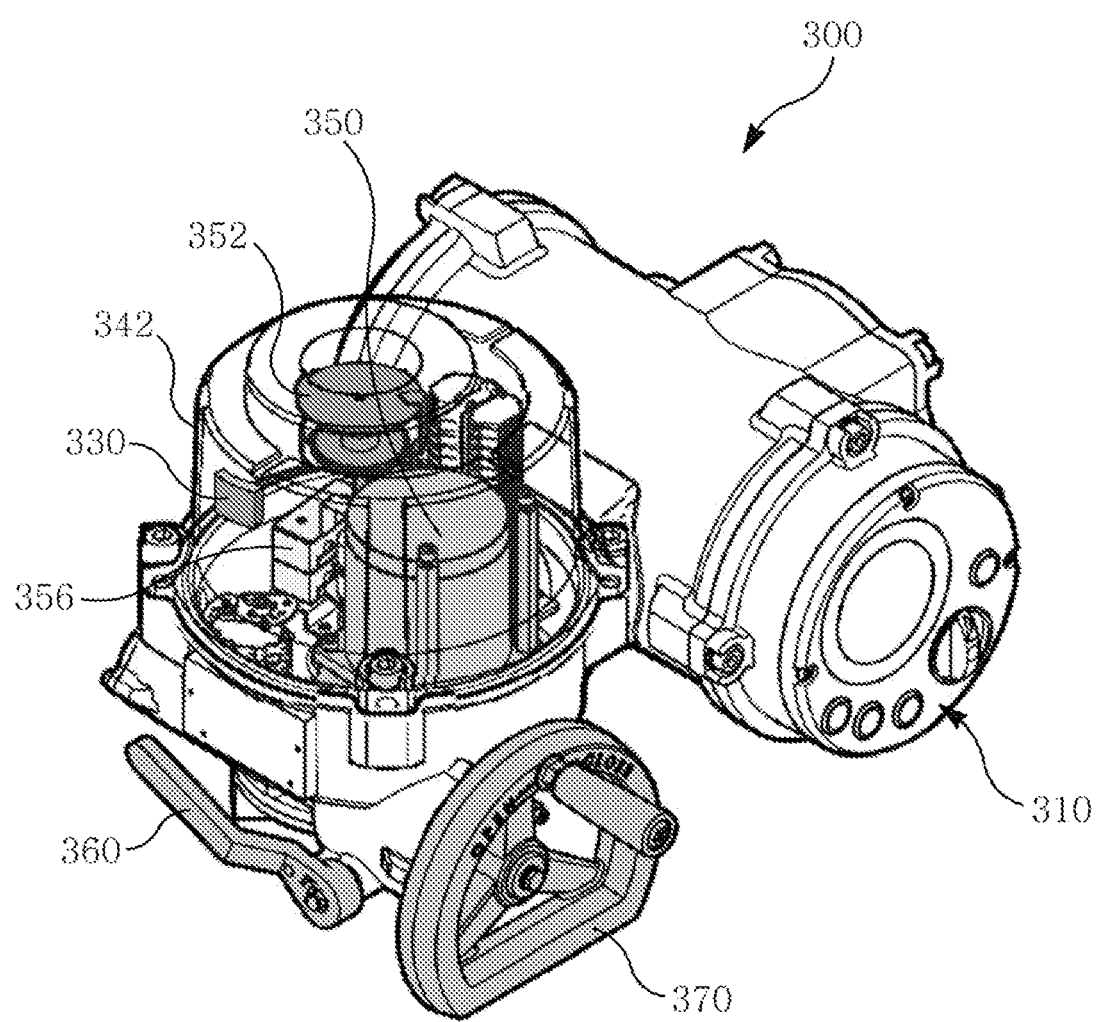
Figure 8:
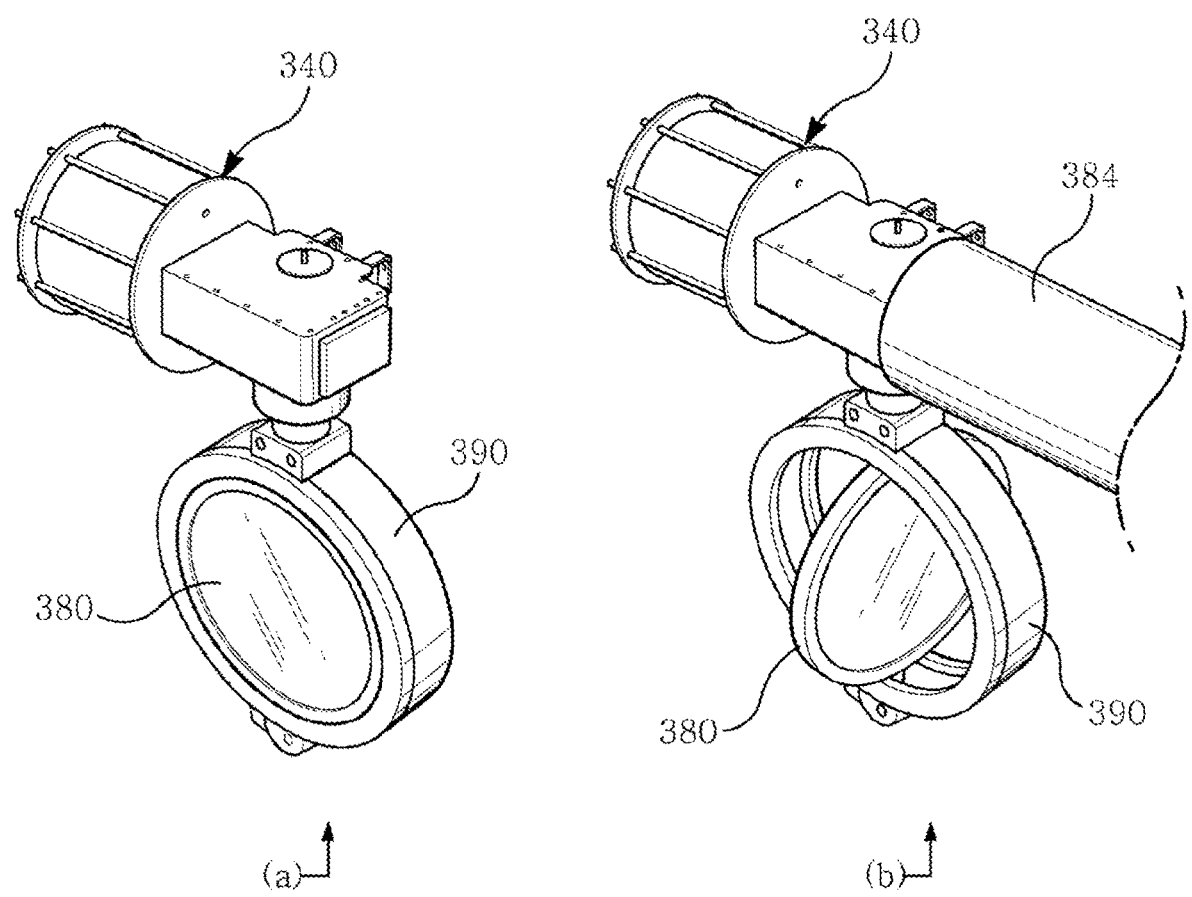

(a) and (b) of FIG. 3 are enlarged circuit diagrams of area A of FIG. 2;

FIG. 4 is a circuit diagram of a fail-safe part according to an embodiment of the present disclosure;

(a) and (b) of FIG. 5 are enlarged circuit diagrams of area B of FIG. 4;

FIG. 6 is a perspective view of a solar fail-safe device according to an embodiment of the present disclosure;

FIG. 7 is a schematic diagram showing a part of a solar fail-safe device according to an embodiment of the present disclosure in a see-through manner; and (a) and (B) of FIG. 8 are schematic diagrams showing a valve and an actuator according to comparison embodiments.

DETAILED DESCRIPTION

Hereinafter, embodiments of the present disclosure will be described with reference to the accompanying drawings.

Figure 1:
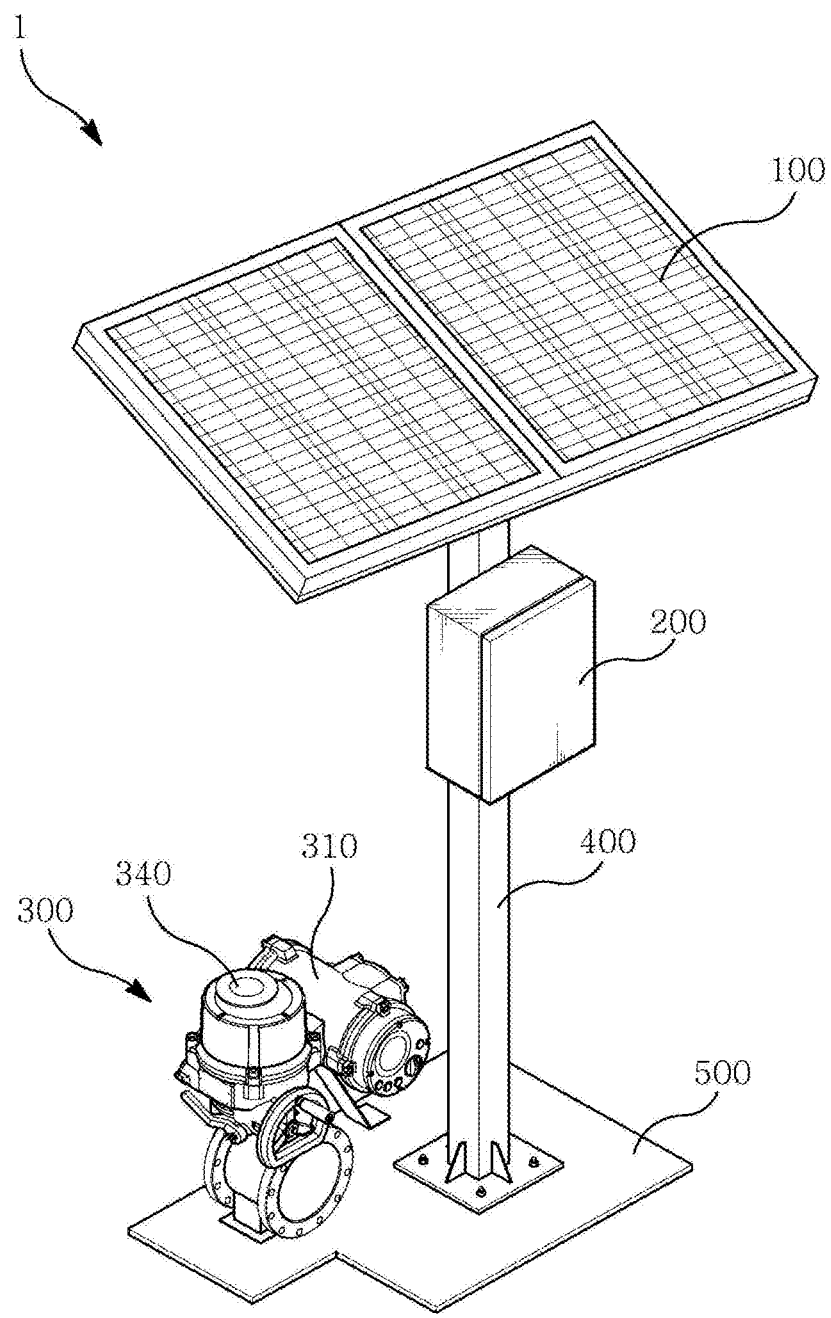
FIG. 1 is a perspective view of a solar fail-safe device according to an embodiment of the present disclosure which is actually installed.

FIG. 1 is a perspective view of a solar fail-safe device 1 according to an embodiment of the present disclosure.

Referring to FIG. 1, the solar fail-safe device 1 may include a solar panel module 100, a control unit 200, an actuator unit, a support 400, and a base plate 500. The solar panel module 100 produces electricity from solar energy. The control unit 200 receives electricity produced by the solar panel module 100 to charge a battery and supplies electricity to the actuator unit 300. The actuator unit includes an actuator 340 receiving electricity from the control unit 200 and being capable of opening and closing a valve 380 when necessary, and further includes a fail-safe part 310 capable of supplying electricity to the actuator 340 when electricity is not supplied from the control unit 200 under a predetermined condition. The control unit 200 is provided at a predetermined position at the support 400. The support 400 is provided with a first end that is in contact with the solar panel module 100 and with a second end that is in contact with the base plate 500. The base plate 500 is in contact with the second end of the support 400 at which the solar panel module 100 and the control unit 200 are provided.

The solar panel module 100 may be supported by the support 400 that is fixed with a predetermined height from the base plate 500 fixed on the ground. The solar panel module 100 may be spaced apart from the control unit 200 upward, having a larger area than the control unit 200 has. The control unit 200 may be shaded by the solar panel module 100 so as to be prevented from having an increase in temperature of or over a reference value due to direct irradiation with sunlight and from being overheated.

The control unit 200 may include a first control circuit 210, a first battery, a wireless signal device 230, and an airtight container. The first control circuit 210 may charge the first battery with electricity from the solar panel module 100, may discharge the first battery under a predetermined condition, and may control supply of electricity to the actuator unit 300. The first battery may be charged with electricity from the solar panel module 100 or may be discharged. The wireless signal device 230 may communicate with external devices to control and monitor the actuator unit 300. The airtight container is for protection from sunlight and blocking from the outside.

Outdoor areas, such as rice fields, hills, etc., are terrain where it is difficult to directly connect external electricity lines, and it may be difficult to adjust opening and closing of the valve 380 installed at a channel, etc.

Therefore, in the terrain where it is difficult to directly connect electricity lines, if the actuator 340 moving the valve 380 uses sunlight as a power source, the valve 380 is effectively opened and closed.

The solar fail-safe device 1 may be installed in large and shade-free terrain where the sun shines brightly, because of its characteristics. Since the control unit 200 may include the first control circuit 210, the first battery 220, and the wireless signal device 230 that are vulnerable to high heat, an appropriate temperature needs to be maintained.

Therefore, the control unit 200 may be provided at the predetermined position at the support 400 so that the control unit 200 is positioned in the shade of the solar panel module 100. The control unit 200 may be provided closer to the solar panel module 100 than to the base plate 500.

FIG. 2 is a circuit diagram of the control unit according to an embodiment of the present disclosure.

(a) and (b) FIG. 3 are enlarged circuit diagrams of area A of FIG. 2.

FIG. 4 is a circuit diagram of the fail-safe part according to an embodiment of the present disclosure.

(a) and (b) of FIG. 5 are enlarged circuit diagrams of area B of FIG. 4.

Referring to FIGS. 2 to 5, operation modes of the solar fail-safe device 1 may include a rest mode, a normal mode, and an emergency mode. In the rest mode, during a rest period in which the actuator 340 does not perform the opening and closing operation, the first battery of the control unit 200 and a second battery 330 of the fail-safe part 310 are charged with electricity produced by the solar panel module 100. In the normal mode, electricity produced by the solar panel module 100 is supplied at a predetermined voltage to the actuator unit so that the valve 380 is opened and closed. In the emergency mode, electricity is supplied at a voltage less than the predetermined voltage from the control unit 200 to the actuator unit.

Referring to FIG. 2, the first control circuit 210 may include: a first detector 212 measuring a voltage at which electricity is supplied from the solar panel module 100 to the control unit 200; first diodes preventing a current from flowing in a reverse direction; and a first relay capable of being turned on/off depending on a signal of the first detector 212.

The normal mode may include a first normal mode and a second normal mode.

(a) and (b) of FIG. 3 are enlarged circuit diagrams of area A within the first control circuit 210. (a) of FIG. 3 shows a current flowing in the first normal mode, and (b) of FIG. 3 shows a current flowing in the second normal mode.

In the first normal mode, when electricity is normally produced from the solar panel module 100 in the daytime, sufficient electricity flows to the actuator unit 300 and simultaneously, the first battery of the control unit 200 or the second battery 330 of the fail-safe part 310 is charged.

To prepare for an emergency in which electricity is not applied at the predetermined voltage to the actuator unit 300 because of continuous cloudy days or a defect of the solar fail-safe device 1, etc., the second battery 330 of the fail-safe part 310 may be charged first and the first battery 220 of the control unit 200 may be charged.

In the first normal mode, the first relay is turned off, so that electricity may not flow from the first battery to the actuator unit 300 and the first battery may be charged with electricity.

In the first normal mode, when charging of the first battery is completed, electricity from the solar panel module 100 is used only for operation of the actuator 340.

In the normal mode and the rest mode, when charging of the first battery is insufficient, electricity flows to both the first battery and the actuator unit 300.

In the second normal mode, when electricity is not normally produced from the solar panel module 100 at night or because of cloudy weather, the first detector 212 detects abnormality of electricity coming from the solar panel module 100 and the state of the first relay is switched to the on state.

In the second normal mode, the electricity with which the first battery is charged may flow from the first battery to the actuator unit 300.

In the second normal mode, when the electricity with which the first battery is charged is exhausted and electricity at the predetermined voltage or higher required for opening and closing the valve 380 is not applied to the actuator unit 300, the emergency mode is entered.

Referring to FIG. 4, a second control circuit 320 may include: a second detector 322 measuring the state of electricity supplied from the control unit 200 to the actuator unit 300; second diodes 324 preventing a current from flowing in a reverse direction; a second relay 326 capable of being turned on/off depending on a signal of the second detector 322; and a third relay 328 for transmitting a fail-safe signal under a predetermined condition.

(a) and (b) of FIG. 5 are enlarged circuit diagrams of area B within the second control circuit 320. (a) of FIG. 5 shows a current flowing in the normal mode, and (b) of FIG. 5 shows a current flowing in the emergency mode.

In the normal mode, the second relay 326 is turned off, so that electricity may not flow from the second battery 330 to the actuator unit 300 and the second battery 330 may be charged with electricity coming from the control unit 200.

Because of continuous cloudy days or a defect of the solar fail-safe device 1, etc., when electricity is not applied at the predetermined voltage from the control unit 200 to the actuator unit 300, the emergency mode in which the fail-safe part 310 operates is entered.

In the emergency mode, the second relay 326 may be turned on and the electricity with which the second battery 330 is charged may be supplied from the second battery 330 to the actuator 340.

In the emergency mode, the third relay 328 may be turned on and a fail-safe warning signal is transmitted to express a state of the emergency mode on an adjustment part 312.

Charging and discharging in each mode of the solar fail-safe device 1 will be described.

In the rest mode, the rest period in which the valve 380 is not opened and closed lasts, and the first battery 220 and the second battery 330 may be charged. The valve 380 may operate with the electricity with which the batteries are charged, in the normal mode and the emergency mode.

In the first normal mode, the first battery 220 may be charged and the second battery 330 may be charged.

In the second normal mode, the first battery 220 may be discharged and the discharged electricity may be supplied to the actuator unit 300 to operate the valve 380, and the second battery 330 may be charged.

In the emergency mode, the second battery 330 of the fail-safe part 310 is discharged so that electricity is supplied to the actuator 340.

FIG. 6 is a perspective view of a solar fail-safe device according to an embodiment of the present disclosure.

FIG. 7 is a schematic diagram showing a part of a solar fail-safe device according to an embodiment of the present disclosure in a see-through manner.

(a) and (b) of FIG. 8 are schematic diagrams showing a valve and an actuator according to comparison embodiments.

Referring to FIGS. 6 to 8, the fail-safe part 310 may include: the second control circuit 320 controlling supply of electricity supplied from the control unit 200, to the actuator 340; the second battery 330 charged for emergency electricity; and the second relay 326 controlling electrical connection between the actuator 340 and the battery.

The actuator 340 may move the valve 380 by using electricity as a power source. For example, the actuator 340 may include a motor 350 that rotates or moves linearly when electricity is input. Herein, it is preferable that the motor 350 reaches the maximum torque as soon as the motor 350 starts and excess rotation rarely occurs when the power source is cut off. Further, in order to prevent overheating, the motor 350 may be provided with a thermostat that detects temperature.

A gear box including at least one gear may be inserted between a shaft of the motor 350 and the valve 380.

For normal operation of the actuator 340, supply of electricity from the solar panel module 100 is required. When an emergency in which supply of electricity stops occurs due to continuous cloudy days or a defect of the solar fail-safe device 1, etc., a follow-up action for the valve 380 is required. For example, the valve 380 may adjust a flow rate of a fluid flowing through a particular pipe 390. The fluid may be made to flow at a set flow rate and the pipe 390 may be closed using the valve 380. While the valve 380 is opened so that the fluid flows at the set flow rate, when the emergency occurs, the actuator 340 operating the valve 380 stops. Therefore, the valve 380 also stops with the pipe 390 opened, and the fluid continues flowing beyond the set flow rate. Herein, due to the fluid beyond the set flow rate, various problems may occur. Conversely, as a result of the occurrence of the emergency, the flow of the fluid may be blocked with the set flow rate unsatisfied, which may also cause various problems.

The fail-safe part 310 may be used to prevent serious damage due to the valve 380 that is not normally controlled in the emergency.

The fail-safe part 310 may perform a fail-safe function for securing safety without causing congestion to lead to accidents and calamities when an emergency occurs or a machine fails.

For example, when supply of electricity from the control unit 200 to the actuator 340 is stopped, the fail-safe part 310 supplies emergency electricity from the pre-charged second battery 330 to the actuator 340. The emergency electricity may include power capable of powering the actuator 340 in an emergency. For example, the emergency electricity may electrically operate the motor 350 of the actuator 340, etc.

Therefore, even when electricity from the control unit 200 is disconnected, the actuator 340 moves the valve 380 using the emergency electricity.

The second relay 326 disconnects electrical connection between the second battery 330 and the actuator 340 when electricity from the control unit 200 is supplied to the actuator 340.

The second relay 326 electrically connects the actuator 340 and the battery when supply of electricity from the control unit 200 is stopped.

Unlike electricity from sunlight, the emergency electricity stored in the second battery 330 is limited. It is preferable that the actuator 340 using the emergency electricity having limited capacity performs a one-time operation of moving the valve 380 from the current position to a preset emergency position at a shortest distance or a shortest angle.

When electricity from the control unit 200 is supplied, the actuator 340 operates in the normal mode in which the actuator 340 moves the valve 380 according to an external control signal.

When the emergency electricity is supplied due to disconnection of electricity from the control unit 200, the actuator 340 operates in the emergency mode in which the actuator 340 ignores the external control signal and moves the valve 380 to the preset emergency position.

In the emergency mode, when the valve 380 moves to the emergency position, the fail-safe part 310 stops supply of the emergency electricity to the actuator 340.

As a result of stopping supply of the emergency electricity to the actuator 340, the valve 380 may remain in the emergency position until supply of electricity from the control unit 200 at the predetermined voltage or higher resumes.

The fail-safe part 310 may be integrated with the actuator 340, or may be formed at an integral unit included in the actuator 340.

For example, the valve 380 may be installed at the pipe 390 through which a fluid flows, and a valve shaft 382 may extend outward from pipe 390. The actuator 340 may include: a base 344 fastened to an outer circumferential surface of the pipe 390; and a cover 342 covering the base 344. Herein, at a surface of the base 344 in contact with the valve shaft 382, a connection means (not shown), such as a groove, etc., connected to the valve shaft 382 may be provided to be movable or rotatable with respect to the base 344.

At the base 344, the motor 350, the gear box, an opening angle meter 352, a limit switch 356, the second battery 330, etc. may be provided. The motor 350, the gear box, the opening angle meter 352, the limit switch 356, the second battery 330, etc. may be covered by the cover 342. The shaft of the motor 350 or the gear box may be linked to the connection means.

The opening angle meter 352 may express the exact position of the valve shaft 382 as a percentage. The second battery 330 is an element in which the emergency electricity is stored, and may be installed in the actuator 340 or the separate integral unit. Referring to FIGS. 2 and 3, a part of the fail-safe part 310 is formed in the separate integral unit, and the battery of the fail-safe part 310 is formed in the actuator 340.

The limit switch 356 may determine a rotation range limit value of the valve shaft 382.

The integral unit has a non-penetrating structure in which a front manipulation part and the interior are completely separated, and may replace a local control panel.

(a) of FIG. 8 shows a comparison embodiment in which the fail-safe part 310 is excluded, and (b) of FIG. 8 shows a comparison embodiment in which a spring return part 384 is applied. In the comparison embodiments of (a) and (b) of FIG. 8, the integral unit is excluded, but may be added similarly to FIGS. 2 and 3 for control and maintenance of the actuator 340.

In the case of a comparison embodiment in which the spring return part 384 is excluded, manufacture in a small size is possible as much as the spring return part 384 is excluded. However, such exclusion is inadequate for coping with an emergency, so it is advantageous for the exclusion to be applied to the pipe 390 in which whether a fluid flows or not does not cause a serious problem.

To cope with an emergency, the spring return part 384 may be added to the actuator 340 as shown in (b) of FIG. 8. The spring return part 384 may restore the position of the valve shaft 382 to a set position with elasticity of a spring in an emergency. Once the spring return part 384 operates, the elasticity of the spring is lost. Unfortunately, only one-time use is possible, and for reuse, the user needs to wind the spring back. Further, in addition to the actuator 340 and the integral unit, the spring return part 384 is required and manufacture in a small size is thus limited.

According to an embodiment of the present disclosure, the solar fail-safe device 1 is capable of coping with an emergency by using the motor 350 that is provided inside the actuator 340 and usually moves the valve shaft 382 according to an external control signal. Herein, among the elements of the fail-safe part 310, a control module, a communication module, etc. except the second battery 330 may be provided on an electric board of the existing actuator 340 or the integral unit. Therefore, the solar fail-safe device 1 according to an embodiment of the present disclosure is similar in appearance to that including the actuator 340 or the integral unit to which only the second battery 330 is added. Accordingly, manufacture in a small size is not severely limited, and the fail-safe function is simply restored by recharging the second battery 330.

When the second battery 330 is discharged, the fail-safe part 310 charges the second battery 330 with electricity from sunlight. In the emergency mode, in the process of operating the actuator, the emergency electricity stored in the second battery 330 may be discharged toward the motor 350. Herein, the discharged emergency electricity may be simply restored by resupplied electricity from sunlight after the emergency mode ends.

In the meantime, when the emergency electricity of the second battery 330 is insufficient because of usual natural discharge, etc., it is difficult to operate the actuator 340 in the emergency mode. Therefore, the state of charge of the second battery 330 needs to be always maintained at an appropriate value or more. To maintain the state of charge, when the state of charge of the second battery 330 is equal or less than a set value, the fail-safe part 310 generates a warning signal and transmits the same to a management server.

In the meantime, it is preferable to provide a method in which a user who visits the site where the actuator 340 is installed controls the actuator 340 manually at the site.

For example, the adjustment part 312 for controlling the actuator 340 may be provided with the actuator 340 (including the integral unit). The adjustment part 312 may include various buttons, touch screens, etc. that the user is able to manipulate.

The adjustment part 312 may be provided at an outer surface of the base 344 or the cover 342 of the actuator 340. It is permissible that the adjustment part 312 may be provided at an outer surface of the integral unit of the actuator 340.

The adjustment part 312 may electrically control or operate the actuator 340 by using solar electricity or emergency electricity.

A handle 370 that directly moves the valve shaft 382 may be provided, and a switching part 360 that links the valve shaft 382 to either the actuator 340 or the handle 370 may be provided.

Herein, it is preferable that the handle 370 is entirely manipulated by a user's physical strength. Therefore, the adjustment part 312 may control the actuator 340 while the handle 370 is let as it is. To this end, it is preferable that the adjustment part 312 controlling the actuator 340 is provided with the actuator 340.

The adjustment part 312 may include a first manipulation means 314, a second manipulation means, and a third manipulation means. Each of the manipulation means may include an input device, such as a button, etc., exposed on an outer surface.

The first manipulation means 314 may be formed to select either a remote mode or a local mode. Alternatively, the first manipulation means 314 may be formed to select one among a remote mode, a local mode, and an off mode.

The remote mode may be an operation mode in which the actuator 340 is controlled using an external control signal received from a remote management server.

The local mode may be an operation mode in which the actuator 340 is controlled using the second manipulation means. The local mode may be a mode in which it is ensured that a user who visits the site manipulates the actuator 340 or moves the valve shaft 382 manually.

Regardless of the remote mode and the local mode, the fail-safe part 310 is able to supply the emergency electricity to the actuator 340 when supply of electricity from sunlight is stopped.

When supply of solar electricity is stopped, fundamentally, the actuator 340 is able to move the valve shaft 382 to the preset emergency position by using the emergency electricity regardless of the remote mode and the local mode. Herein, the emergency position may be set without limitation, and is preferably set before an emergency. Depending on the situation of the solar fail-safe device 1 installed, it may be preset whether to open, close, or maintain the valve shaft 382 as it is. In the emergency mode, the operation of the valve shaft 382 may be controlled manually at the site or remotely.

The off mode may be used to release the limitation of the emergency position forced in an emergency or to set various options for the actuator 340.

The off mode may be a mode in which the operation of the actuator 340 is forcibly stopped.

An option menu for determining the operation of the actuator 340 when supply of solar electricity is stopped may be provided in the off mode. Herein, the third manipulation means may manipulate or set the option menu.

The adjustment part 312 for setting the operation of the actuator 340 while the emergency electricity is supplied may be provided with a remote switch and a local switch.

The remote switch may set the operation of the actuator 340 in an emergency that occurs while the actuator 340 is controlled (remote mode) by using an external control signal.

The local switch may set the operation of the actuator 340 in an emergency that occurs while the actuator 340 is controlled (local mode) by using the second manipulation means of the adjustment part 312.

According to an embodiment of the present disclosure, the actuator unit 300 includes: the valve shaft 382 as a movable element capable of opening and closing the flow path in a rotatable manner; the motor 350 operated by the supplied power; the gear box including an reduction gear and transmitting the torque of the electric motor 350 to the valve shaft 382; the limit switch limiting and determining the rotation range of the valve shaft 382; the second control circuit 320 controlling operation of the motor 350 according to a signal received through a control signal line; and the second battery 330 charged with power when electricity from the control unit 200 is supplied at the predetermined voltage or higher, and supplying the stored power to the actuator 340 when electricity from the control unit 200 is supplied at a voltage less than the predetermined voltage, e.g., disconnected. Even when power from the outside of the actuator unit 300 is disconnected, the actuator unit 300 enables the state of the valve 380 to be converted into/maintained in a stable state by using the stored power.

In general, the valve shaft 382 has a disc connected thereto for regulating opening and closing of the flow path, so that the disc opens and closes the valve 380 according to a hinge rotation on the valve shaft. Depending on the degree to which the disc is closed, the flow rate and the flow velocity of the fluid flowing through the pipe 390 may be adjusted. It is preferable that the valve shaft 382 operates sufficiently receiving the torque supplied from the motor 350 with almost no friction.

The gear box uses multiple reduction gears so that the torque and the speed generated by the motor 350 that is electrically operated are transmitted to the valve shaft 382 appropriately for the opening and closing of the flow path. Inside the gear box, there are gears having different diameters engaged with a gear connected to a rotation shaft of the electric motor 350. The gears convert a fast rotation speed and a small torque of the motor 350 to a slow speed and a large torque.

The motor 350 is an electric motor 350 used in a general machine industry field. The electric motor 350 is operated by power supplied from the outside or by power with which the second battery 330, internally included, is charged. As the motor 350, an induction motor 350 may be generally used. While its torque is transmitted to appropriate reduction gears and a power transmission device so as to generate various torques and speeds, the valve shaft 382 is rotated. Therefore, it is preferable that a gear is integrated with the rotation shaft of the motor 350. The gear is engaged with the gears having different diameters of the gear box so that deceleration and conversion into a strong torque are achieved.

The second control circuit 320 performs control such that power supplied from an external power source line or the second battery 330 of the actuator unit 300 is supplied to the motor 350 according to a signal input through a control signal line. Therefore, in addition to if the user inputs an operation signal through the control signal line from the outside to operate the valve 380, if an operation signal is automatically input from the outside when the valve 380 needs to operate under a predetermined condition, the second control circuit 320 makes the motor 350 operate with the power supplied through the power source line.

Limit switches are generally spaced apart from the valve shaft by a predetermined distance and positioned at two sides. The limit switches adjust the radius of rotation of the valve shaft. The limit switches allow the disc, etc. connected to the valve shaft 382 to rotate by the radius of rotation of the circumference having the valve shaft 382 in the center, thereby regulating the flow path.

The second battery 330 may be charged in the rest mode or the normal mode.

Accordingly, when electricity is supplied from the control unit 200, a state of being sufficiently charged with power is maintained. When a voltage at which electricity is applied from the control unit 200 is less than a predetermined value, the electric motor 350 is operated with the charge power. Therefore, an energy storage device needs to be connected to the power source line, and when an external power source is disconnected, power is supplied to the second control circuit 320 and the electric motor 350 through the power source line coming into the inside.

Thus, when the power source is supplied to the power source line, the power is stored in the second battery 330 connected thereto. When supply of the power source is cut off for a power failure, etc., the second control circuit 320 supplies the power to the motor 350 so that the state of the valve 380 is converted into/maintained in a stable state by using the power stored in the storage device. Herein, a delay timer operates according to user's setting so that after supply of the power source is disconnected, and after a set time passes, conversion into/maintenance in the stable state is performed.

Therefore, when the power source to the motor-operated valve 380 is cut off, conversion into/maintenance in the stable state is performed according to the user's setting. Thus, it is possible to prevent an accident in which because of disconnection of supply of the power source, the valve 380 that needs to be closed is opened so an internal fluid leaks or the valve 380 that needs to be opened is closed so explosion occurs due to overpressure. In addition, an embodiment of the present disclosure may be effectively employed for installation of the motor-operated valve 380 in which safety is important.

According to an embodiment of the present disclosure, the power supplied from the second control circuit 320 to the power source line is supplied to the motor 350 according to a signal through the control signal line. The motor 350 transmits torque to the valve shaft 382 through the gear box including the reduction gears so as to open and close the valve 380. Herein, the rotation range is determined by the limit switches. Since the second battery 330 is connected to the power source line, the second battery 330 is charged with the power supplied from the control unit 200 and simultaneously, when a voltage at which electricity is applied from the control unit 200 is less than a predetermined value, the second battery 330 supplies the stored power to the electric motor 350 and the second control circuit 320.

Further included may be the delay timer that enables conversion into/maintenance in the stable state to be performed after a set time passes according to user's setting when the voltage at which electricity is applied from the control unit 200 is less than the predetermined value.

The delay timer performs a function of enabling the power stored in the second battery 330 to be supplied after the set predetermined time passes according to a time preset by the user when a voltage at which electricity is applied from the control unit 200 is less than the predetermined value.

The delay timer is connected to the second control circuit 320. When the voltage at which electricity is applied from the control unit 200 is less than the predetermined value, a predetermined time set by the user passes and then the delay timer enables the power to be supplied from the second battery 330 through the second control circuit 320.

The actuator unit may further include a power source disconnection detector that detects whether supply of the external power source is disconnected. In addition, although not shown in the drawings, the power source disconnection detector makes a warning sound when the voltage at which electricity is applied from the control unit 200 is less than the predetermined value, so that the user is able to recognize the situation.

The power source disconnection detector is a device that detects whether a voltage at which electricity is applied from the control unit 200 through the power source line is less than a predetermined value. The power source disconnection detector is generally connected to the power source line and the second control circuit 320.

In the case where an embodiment of the present disclosure includes the delay timer, the power source disconnection detector may be directly connected to the delay timer. That is, information on the time when the voltage at which electricity is applied from the control unit 200 is less than the predetermined value is transmitted to the delay timer, and after a predetermined time set by the user through the delay timer passes, information that the power source has been disconnected is transmitted to the second control circuit 320.

As described above, by adding the power source disconnection detector, when electricity is supplied according to whether power is supplied from the control unit 200, the second battery 330 is charged with the external power and simultaneously, the valve 380 is operated. Further, when the voltage at which electricity is applied from the control unit 200 is less than the predetermined value, power is supplied from the second battery 330.

Even when the delay timer is not included, the power source disconnection detector is provided so that whether power is supplied from the second battery 330 is selected according to whether power from the control unit 200 is disconnected.

In addition, when the voltage at which electricity is applied from the control unit 200 is less than the predetermined value, the power source disconnection detector makes a warning sound so that the user recognizes the situation. The warning sound may be implemented through a separate warning device, or may be implemented through a warning device integrated with the power source disconnection detector.

Although exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A solar fail-safe device, comprising:
   a solar panel module producing electricity from solar energy;
   an actuator unit including an actuator moving a valve by using electricity as a power source, and a fail-safe part moving the valve by using emergency electricity with which the fail-safe part is pre-charged; and
   a control unit receiving the electricity produced from the solar panel module to charge a first battery and a second battery and to supply the electricity to the actuator unit,
   wherein the actuator moves the valve by using the emergency electricity when a voltage at which the electricity is applied from the control unit is less than a predetermined value-,
   wherein the control unit comprises the first battery charged with the electricity from the solar panel module, and a first control circuit controlling electrical connection between the actuator unit and the first battery;
   the first control circuit disconnects electrical connection between the actuator unit and the first battery when a voltage at which the electricity is applied from the solar panel module is equal to or greater than a predetermined value; and
   the first control circuit electrically connects the actuator unit and the first battery when the voltage at which the electricity is applied from the solar panel module is less than the predetermined value.

2. A solar fail-safe device comprising:
   a solar panel module producing electricity from solar energy;
   an actuator unit including an actuator moving a valve by using electricity as a power source, and a fail-safe part moving the valve by using emergency electricity with which the fail-safe part is pre-charged; and
   a control unit receiving the electricity produced from the solar panel module to charge a first battery and a second battery and to supply the electricity to the actuator unit,
   wherein the actuator moves the valve by using the emergency electricity when a voltage at which the electricity is applied from the control unit is less than a predetermined value,
   wherein the fail-safe part comprises:
      the second battery charged with the emergency electricity; and
      a second control circuit controlling electrical connection between the actuator and
   the second battery;
   the second control circuit disconnects electrical connection between the actuator and the second battery when the voltage at which the electricity is applied from the control unit is equal to or greater than the predetermined value; and
   the second control circuit electrically connects the actuator and the second battery when the voltage at which the electricity is applied from the control unit is less than the predetermined value.

3. A solar fail-safe device comprising:
a solar panel module producing electricity from solar energy;
an actuator unit including an actuator moving a valve by using electricity as a power source, and a fail-safe part moving the valve by using emergency electricity with which the fail-safe part is pre-charged; and
a control unit receiving the electricity produced from the solar panel module to charge a first battery and a second battery and to supply the electricity to the actuator unit,
wherein the actuator moves the valve by using the emergency electricity when a voltage at which the electricity is applied from the control unit is less than a predetermined value,
wherein when the voltage at which the electricity is applied from the control unit is equal to or greater than the predetermined value, the actuator operates in a normal mode in which the valve is moved, according to an external control signal or a preset timer; and
when the voltage at which the electricity is applied from the control unit is less than the predetermined value, the actuator operates in an emergency mode in which the emergency electricity of the second battery is supplied and the actuator ignores the external control signal and moves the valve to a preset emergency position.

4. The solar fail-safe device of claim 3, wherein a normal mode includes at least one among a first normal mode and a second normal mode;
in the first normal mode, when a voltage at which the electricity is applied from the solar panel module is equal to or greater than a predetermined value, the electricity is supplied to the first battery and the actuator unit and electrical connection between the first battery and the actuator unit is disconnected; and
in the second normal mode, when the voltage at which the electricity is applied from the solar panel module is less than the predetermined value, the first battery and the actuator unit are electrically connected to each other.

5. The solar fail-safe device of claim 3, wherein the second battery is provided with the emergency electricity stored therein;
when the second battery is discharged, the fail-safe part charges the second battery by using the electricity produced from the solar panel module; and
when a state of charge of the second battery is equal to or less than a set value, the fail-safe part generates a warning signal and transmits the warning signal to a management server.

6. The solar fail-safe device of claim 3, wherein in the emergency mode, when the valve is moved to the emergency position, the fail-safe part stops supply of the emergency electricity to the actuator; and
as a result of stopping supply of the emergency electricity to the actuator, the valve remains in the emergency position until supply of the electricity from outside resumes.

7. The solar fail-safe device of claim 3, wherein the control unit comprises:
the first battery charged with the electricity from the solar panel module; and
a first control circuit controlling electrical connection between the actuator unit and the first battery;
the first control circuit comprises:
a first detector measuring a voltage at which the electricity is supplied from the solar panel module to the control unit;
first diodes preventing a current from flowing in a reverse direction; and
a first relay capable of being turned on/off depending on a signal of the first detector;
in a first normal mode, with the first relay turned off, the first battery and the actuator unit are electrically disconnected from each other, the first battery is charged, and the electricity is supplied to the actuator unit; and
in a second normal mode, the first detector detects a voltage drop from the solar panel module and makes the first relay turned on, and the first battery and the actuator unit are electrically connected to each other.

8. The solar fail-safe device of claim 3, wherein the fail-safe part comprises:
the second battery charged with the emergency electricity; and a second control circuit controlling electrical connection between the actuator and the second battery;
the second control circuit comprises: a second detector measuring a state of the electricity supplied from the control unit to the actuator unit; second diodes preventing a current from flowing in a reverse direction; and a second relay capable of being turned on/off depending on a signal of the second detector;
in a normal mode, with the second relay turned off, the second battery and the actuator are electrically disconnected from each other, the second battery is charged, and the electricity is supplied to the actuator; and
in an emergency mode, the second detector detects a voltage drop from the control unit and makes the second relay turned on, and the second battery and the actuator are electrically connected to each other.

9. The solar fail-safe device of claim 8, wherein the control unit is provided with a wireless signal device;
the second control circuit comprises a third relay;
the actuator unit is provided with an adjustment part controlling the actuator unit; and
in the emergency mode, the second detector detects the voltage drop from the control unit and makes the third relay turned on, and a fail-safe warning signal is shown on the adjustment part.

10. The solar fail-safe device of claim 3, wherein the solar panel module is supported by a support that is fixed with a predetermined height from a base plate fixed on ground;
the solar panel module is spaced apart from the control unit upward, having a larger area than the control unit has; and
the control unit is shaded by the solar panel module so as to be prevented from having an increase in temperature of or over a reference value due to direction irradiation with sunlight and from being overheated.

11. The solar fail-safe device of claim 3, wherein the solar fail-safe device is in one among a rest mode, a normal mode, and an emergency mode;
in the rest mode, a rest period in which the valve is not opened and closed lasts, and the first battery of the control unit and the second battery of the fail-safe part are charged, and the electricity with which the first and the second battery are charged is used to operate the valve in the normal mode and the emergency mode;
the normal mode is at least one among a first normal mode and a second normal mode;
in the first normal mode, the first battery and the second battery are charged;
in the second normal mode, the first battery is discharged and discharged electricity is supplied to the actuator unit to operate the valve, and the second battery is charged; and in the emergency mode, the second battery of the fail-safe part is discharged so that electricity is supplied to the actuator.

\* \* \* \* \*